March 29, 1927.  
W. A. GUENTHER ET AL  
1,622,442  
BUMPER FOR MOTOR VEHICLES  
Filed Jan. 22, 1926
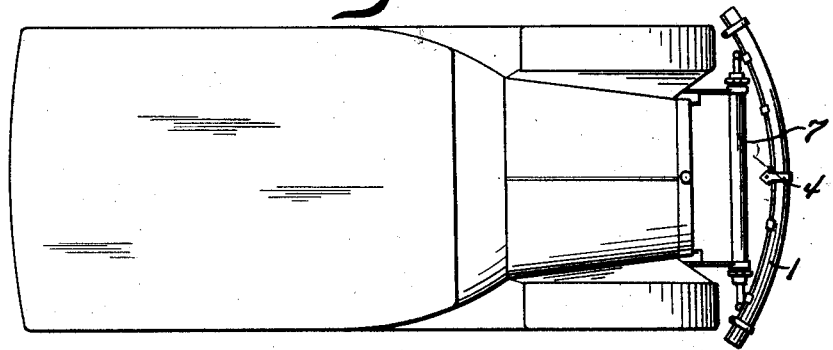
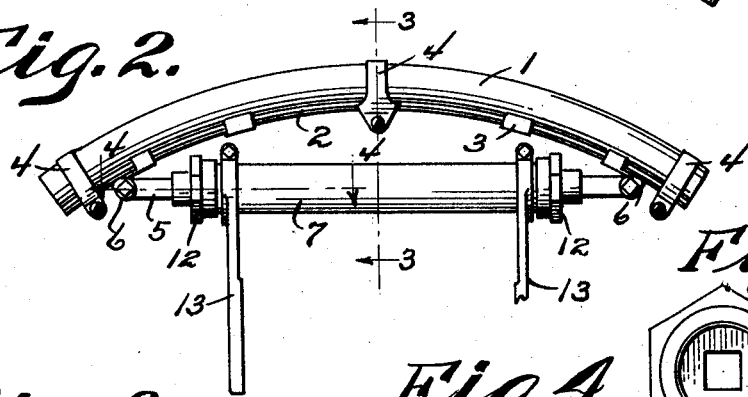
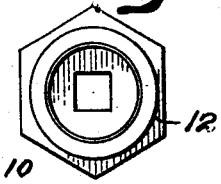
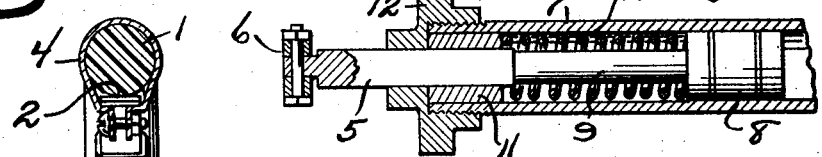
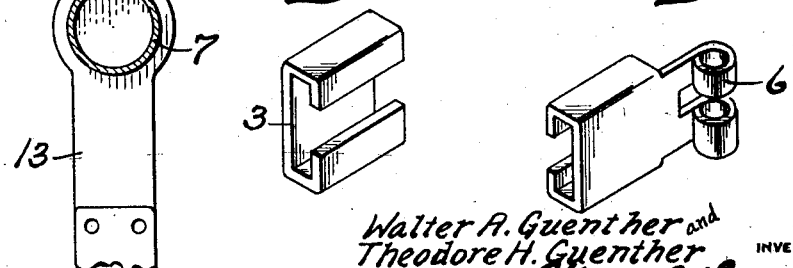
Walter A. Guenther and
Theodore H. Guenther INVENTOR.
BY Victor J. Evans ATTORNEY
WITNESS: John Donovan Patented Mar. 29, 1927.

1,622,442

UNITED STATES PATENT OFFICE.

WALTER A. GUENTHER AND THEODORE H. GUENTHER, OF HOLYOKE, MASSACHUSETTS.

BUMPER FOR MOTOR VEHICLES.

Application filed January 22, 1926. Serial No. 83,042.

This invention relates to a bumper for motor vehicles and the like, the general object of the invention being to provide a bumper formed in part of a member composed of resilient material, a metal spring and spring plungers operating in a cylinder which is attached to the vehicle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the vehicle showing the invention in use.

Figure 2 is an enlarged view of the bumper itself.

Figure 3 is a section on line 3—3 of Figure 2.

Figure 4 is a section on line 4—4 of Figure 2.

Figures 5, 6 and 7 are detail views.

In these views, 1 indicates an arc-shaped member which may be of a solid piece of rubber or other resilient material or it may be made similar to a pneumatic tube by forming it hollow and inserting an inflatable tube within the same. A number of spring leaves 2 are held together by the clips 3 and the member 1 is fastened to these leaves by the clips 4. A pair of bars 5, preferably of square shape in cross section, are fastened to the leaf springs by the shackles 6 and these bars pass into the cylinder 7 where they are connected with the pistons 8 by the stems 9 which are of circular shape in cross section. Springs 10 are arranged on these stems and act to retard the outward movement of the pistons. A bushing 11 is provided for each bar 5 at each end of the cylinder and a cap 12 threaded to each end of the cylinder holds the parts in position. The cylinder is attached to the vehicle by the brackets 13.

In operation, it will be appreciated that should the bumper come in contact with another vehicle or object, the member 1 and springs 2 will be pushed in, to cause the springs and member to move outwardly, thus causing a pulling force to be imparted to the pistons 8, against the tension of the springs 10, which springs tend to co-act with the member 1 and springs 2 for absorbing the shock and which springs 10 also serve to return the parts to normal position.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A bumper for vehicles comprising a normally bowed member of resilient material, a cylinder adapted to be rigidly mounted on the chassis frame of a vehicle, plungers slidably mounted in opposite ends of said cylinder and respectively connected with the ends of said bowed member for movement away from each other upon the inward flexing of said bowed member.

2. A bumper for vehicles comprising a normally bowed member of resilient material, a cylinder adapted to be rigidly mounted on the chassis frame of a vehicle, plungers slidably mounted in opposite ends of said cylinder and respectively connected with the ends of said bowed member for movement away from each other upon the inward flexing of said bowed member, and springs interposed between the heads of the respective plungers and the ends of the cylinder for tensioning said plungers against the inward flexing movement of said bowed member.

3. A bumper for vehicles comprising an arc shaped member formed of resilient material, curved leaf springs connected to said member and fitting against the inner curved surface of said member, a cylinder adapted to be rigidly mounted on the chassis frame of a vehicle, the ends of which are disposed adjacent the ends of said member, a pair of plungers slidably mounted in the opposite ends of said cylinder and extending therefrom, said plungers respectively connected with the opposite ends of said leaf springs, and springs respectively provided between the heads of said plungers and the ends of said cylinders for placing said springs under tension upon the inward flexing of said leaf springs.

In testimony whereof we have affixed our signatures.

WALTER A. GUENTHER.
THEODORE H. GUENTHER.